J. V. BRYSON.
Improvement in Gleaner Attachment for Harvesters.
No. 131,844.  Patented Oct. 1, 1872.
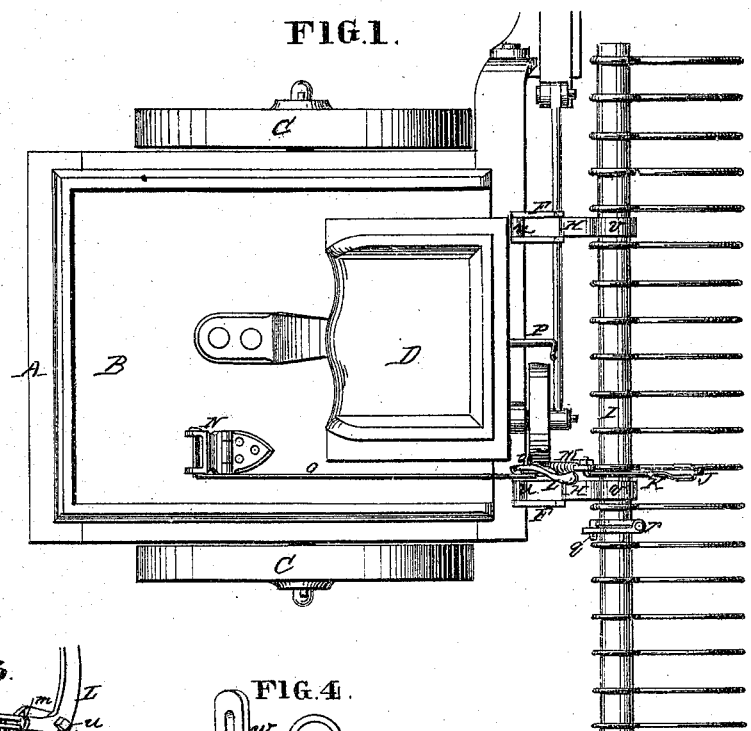
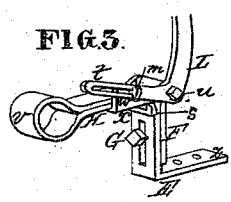
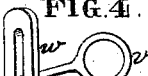
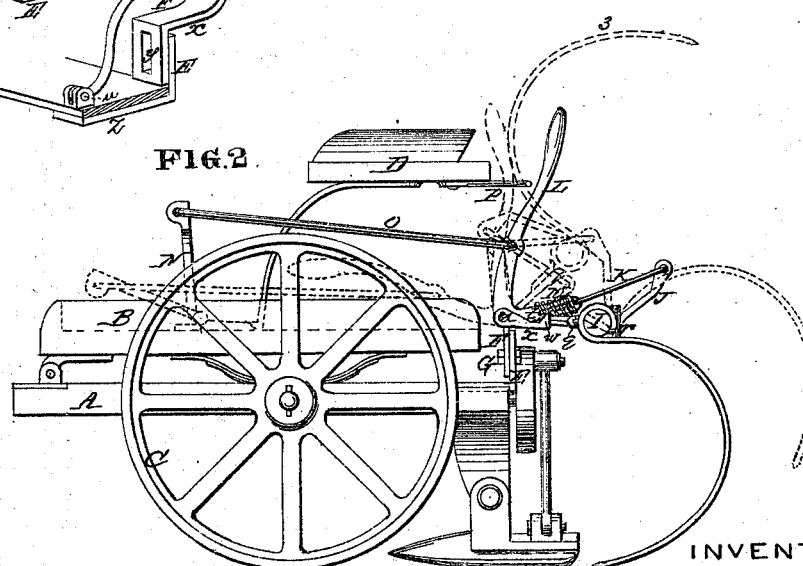
ATTEST.
Jas L Ewin
Walter Allen
INVENTOR.
Jas. V. Bryson
By Knight Bro
atty

UNITED STATES PATENT OFFICE.

JAMES V. BRYSON, OF GREENUP, KENTUCKY, ASSIGNOR TO HIMSELF AND HENRY M. CARTER, OF LA FAYETTE, INDIANA.

IMPROVEMENT IN GLEANER ATTACHMENTS FOR HARVESTERS.

Specification forming part of Letters Patent No. 131,844, dated October 1, 1872.

*To all whom it may concern:*

Be it known that I, JAMES V. BRYSON, of Greenup, in the county of Greenup and State of Kentucky, have invented certain Improvements in Gleaner Attachments for Harvesters, of which the following is a specification:

Nature and Objects of the Invention.

A spring-tooth rake of about the same length as the cutter-bar is attached behind the harvester, and adapted to yield automatically, so as to pass obstructions, to be lifted to discharge its load, and to be doubled up and fastened in elevated position for passing from place to place, the object of the device being to adapt the machine to glean after the binder. In these respects the invention is like that for which Letters Patent No. 118,430 were issued to me August 29, 1871. My present invention consists, primarily, in attaching the rake directly to the main frame of the harvester, and behind and close to the same, the head of the rake constituting a part of the hinge; secondly, in an elastic and self-locking device for lifting the rake and holding it in working position; thirdly, in a simple and effective form of vertically-adjustable compound hinge for attaching the rake to harvester-frames of different heights.

Description of the Drawing.

Figure 1 is a plan view, showing the improved attachment applied to a reaper-frame, and in working position. Fig. 2 is a side elevation of the same, showing in full lines the rake in its working position, and in dotted lines the same as lifted to discharge grain, and as fastened behind the driver's seat. Fig. 3 is a perspective view of one of the hinge-connections and the lifting and locking lever and their appurtenances. Fig. 4 is a perspective view of a modified form of hinge-connection.

General Description.

A B represent the gearing and seat-frames, C C the ground-wheels, and D the driver's seat, of a harvester. E F E F are a pair of extensible standards attached by base-plates $z$ to the rear bar of the gearing-frame, at or near the extremities of the same. These standards are composed of overlapping sections, slotted or perforated to receive clamping-bolts G, by which their parts are united and held at the proper adjustment. $x$ are rearwardly-projecting arms of the extensions F, and $w$ vertically-extended lateral supports at the ends of said arms. H H are links hinged by eyes $v$ to the rake-head I, and by pintles $u$ to the said extensions, as in Figs. 1, 2, and 3, or directly to the frame A, as in Fig. 4, as may be most convenient, their free ends resting in the said lateral supports $w$, which may be guide-lugs, as shown in Figs. 1, 2, and 3, or slots, as shown in Fig. 4. J is an arm projecting from the rake-head I; K, a connecting rod or link; and L, the dumping-lever. This is made in bell-crank form, its rear arm $t$, to which the connecting-rod K is attached, being short and slotted longitudinally to receive the attaching-pintle of the same, and provided with a spring, M, below the said pintle and above a shoulder, $m$, thereon, to yieldingly support the former. Said lever is hinged by the pintle $u$ or an independent pintle to the convenient extensible standard E F, or directly to the frame A, and a stop, $s$, is arranged on the said standard or other convenient support. N is a treadle for assisting in elevating the rake, and O a rod connecting the same to the hand-lever L. $r$ represents the hinge in the rake-head, and $q$ the wooden pin for locking the same. P is a hook beneath the driver's seat D, for fastening the rake behind the same when it is out of use. For this I propose substituting a bar or chain attached to the frame. The stop $s$ being properly arranged, the pintle connecting the lever L and connecting-rod K is carried past the center of movement in operating the lever, the spring M yielding sufficiently; and the rake is thus locked in working position without the aid of ratchets or other independent locking devices, and with a superior degree of elasticity. In riding over obstructions the principal movement is at the joints $u$, which are primarily intended for this purpose. The movement of all the joints is utilized in lifting the rake to its position behind the driver's seat. A pair of the hinge attachments of the rake are used so as to give it the requisite extended support and greatest freedom of movement.

I am aware that springs have been employed to hold pivoted rakes to their work. My spring (M) is employed primarily to permit a free movement of the self-locking device for operating the rake, and to permit the employment of a stiff connecting-rod, and the peculiar arrangement of said spring serves to obviate any necessity for additional spring attachments.

The following is claimed as new:

1. A gleaning-rake hinged directly to the main frame of a harvester, and behind and close to the same, the head of the rake constituting a part of the hinge, substantially as herein shown and described.

2. The dumping-lever L, with its slotted arm $t$ and spring M, in combination with the link K, arm J, and stop $s$, constituting an elastic self-locking device for rocking the rake-head and holding the rake in working position.

3. The vertically-adjustable compound hinge, composed of extensible standards E F, with arms $x$ and guides $w$, clamping-bolts G, and links H with hinges $v$ and $u$, combined and arranged substantially as shown, for the purpose specified.

JAMES V. BRYSON.

Witnesses:
F. C. GIBBS,
G. M. GORDY,
NELSON W. EVANS.